Aug. 18, 1936.  P. KÖHLER  2,051,723

ABSORPTION REFRIGERATION SYSTEM

Original Filed Nov. 11, 1930

INVENTOR.
Peter Köhler
BY
ATTORNEY.

Patented Aug. 18, 1936

2,051,723

UNITED STATES PATENT OFFICE 2,051,723

ABSORPTION REFRIGERATION SYSTEM

Peter Köhler, Stockholm, Sweden, assignor, by mesne assignments, to Servel, Inc., Dover, Del., a corporation of Delaware Original application November 11, 1930, Serial No. 494,827. Divided and this application March 25, 1933, Serial No. 662,653. Renewed July 31, 1934. In Germany January 24, 1930

15 Claims. (Cl. 62—119.5)

This invention relates to absorption refrigerating systems of the pressure equalized type and more particularly to the circulation of fluids in such systems. The present invention is a division of my application Serial No. 494,827, filed November 11, 1930.

Among the objects of the invention are to provide improved liquid circulation and distribution in the system, reduction in the amount of energy required to produce circulation, improved contact between gas and solution in the absorber, and increased cooling of the absorber, with resulting improved efficiency of the system.

Figure 1:
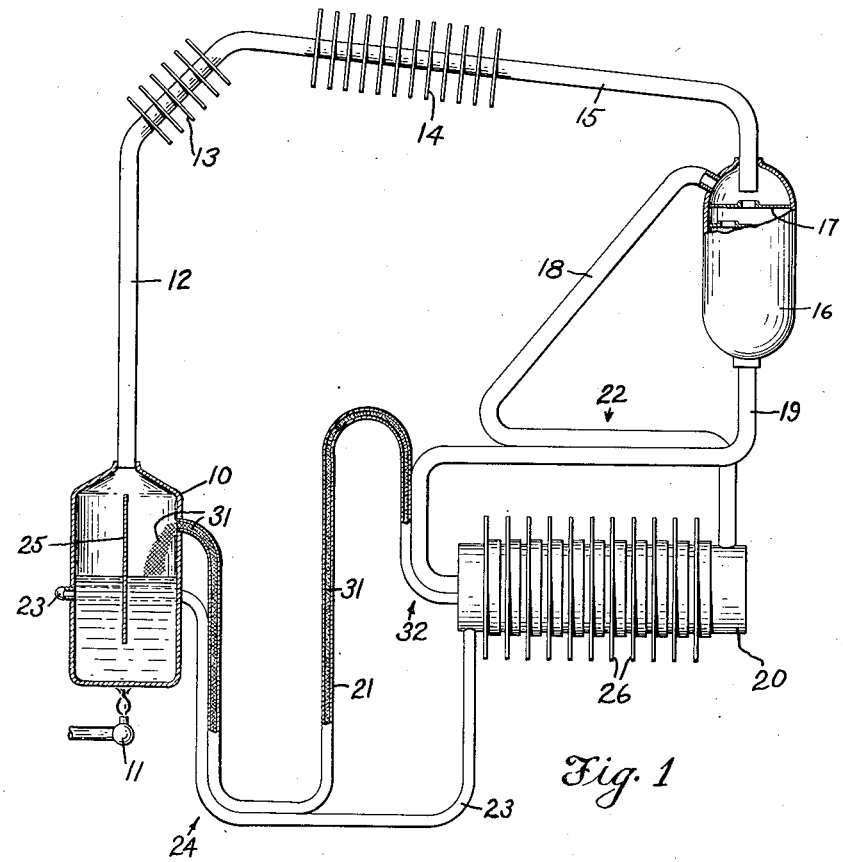
Figure 2:
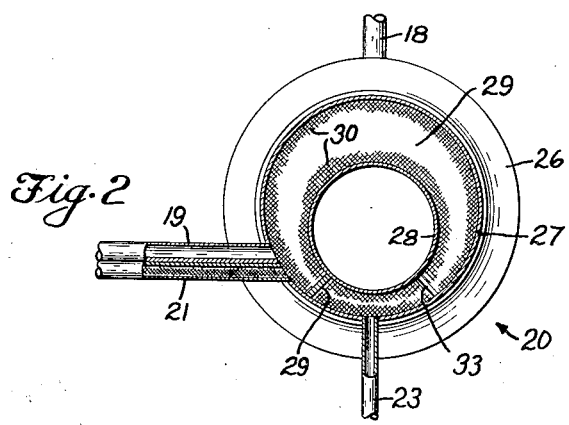

Other objects and advantages of this invention will be apparent from the following description taken in connection with the accompanying drawing, in which, Fig. 1 shows schematically a refrigerating system embodying the invention; and Fig. 2 is a cross section of the absorber shown in Fig. 1.

Referring to the drawing, a generator 10 containing a solution of a refrigerant in an absorption liquid such as ammonia in water is heated by a gas burner 11. Ammonia vapor expelled from solution in the generator 10 flows in conduit 12 through the rectifier 13 to the condenser 14. In the rectifier 13 water vapor condenses out of the ammonia and drains back to the boiler through conduit 12. In the condenser 14 the ammonia vapor is condensed to liquid, which latter flows in conduit 15 to the evaporator 16 where it flows downwardly over baffle plates 17 evaporating by diffusion into an inert pressure equalizing gas such as hydrogen which enters the evaporator through conduit 18.

The resulting gas mixture flows from the lower part of the evaporator 16 through conduit 19 to an absorber 20. In the latter the gas mixture comes in contact with weak absorption liquid which flows from the generator 10 to the absorber through conduit 21 as hereinafter described. Ammonia is absorbed out of the gas mixture into the weak solution and the hydrogen or weak gas returns to the evaporator through conduit 18. The warm weak gas flowing through conduit 18 is brought into heat exchange relation with the cool rich gas flowing through conduit 19 in the gas heat exchanger 22. Circulation of the gas between the absorber and evaporator occurs due to the difference in weights of the columns of rich and weak gas.

Enriched absorption liquid from the absorber 20 is conducted back to the generator 10 through conduit 23. Conduits 21 and 23 extend in heat exchange relation at 24 for transfer of heat from the hot weak solution to the cool enriched absorption solution. Conduits 21 and 23 are connected to the boiler 10 on opposite sides thereof and a baffle plate or partition 25 is provided, as shown in Fig. 1, so that the liquid must flow downwardly under the baffle through that portion of the generator heated directly by the burner 11.

As best shown in Fig. 2, the absorber 20 comprises an outer tubular shell 27 and an inner tubular shell 28 forming a chamber 29 closed at each end by suitable end plates welded or otherwise secured to the ends of the tubes 27 and 28. A partition 29 secured between and extending longitudinally of the tubes 27 and 28 in the lower part of chamber 29 forms with the tube 28 a partition or baffle extending upwardly within and dividing the chamber 29. Spacing members 33 are employed to support tube 28 with respect to the outer tube 27 to facilitate assembly of the absorber.

The interior surface of the outer tube 27 and also the outer surface of the tube 28 are covered with a capillary or wick-like material such as steel mesh 30. The conduit 21 for weak solution from the generator to the absorber is connected to the latter on one side of the partition 29 and the return conduit 23 for enriched absorption solution is connected to the absorber on the other side of the partition 29. The gas conduits 18 and 19 from the evaporator are connected to the absorber so that flow of gas is lengthwise and upwardly in chamber 29, the rich gas entering the lower part of the absorber through conduit 19 at one end and leaving the upper part of the absorber from the other end through conduit 18. Weak absorption liquid entering the absorber through conduit 21 is carried upwardly along the surfaces of the shells 27 and 28 by capillarity of the wicks 30, in contact with the inert gas flowing through chamber 29.

The wicks 30 comprise capillary syphons which function to circulate absorption liquid through the absorber against the action of gravity and maintain the solution in bodies of extensive surface in contact with the gas, thereby aiding absorption of the ammonia vapor. Heat of absorption is removed from the liquid in its paths of flow through the absorber by transfer to the atmosphere through inner and outer shells 28 and 27. Although heat radiating fins 26 have been shown on the exterior of the absorber for removal of heat of absorption, it is obvious that cooling water coils may be provided either or both around the outer shell 27 and the inner shell 28.

Although not shown it is also contemplated that the conduit 19 for cool rich gas from the evaporator may be extended in heat exchange relation with the inner tube 28, or even that the latter may be utilized as a portion of the conduit for the cool rich gas.

Circulation of absorption solution between the generator 10 and the absorber 20 is accomplished by capillarity aided by an arrangement of liquid columns of different densities effected by heating and cooling. Conduit 21 for weak absorption solution is connected to the generator 10 above the liquid level therein and is proved in part or throughout, as shown, with a wick 31 of suitable material such as steel mesh, previously indicated for use in the absorber. The wick 31 extends from the opening of conduit 21 in the generator 10 downwardly to the level of liquid therein on the side of the baffle 25 opposite the connection of conduit 23 for enriched absorption liquid. With this arrangement, weak absorption solution flows by capillarity from the liquid level in the generator upwardly into conduit 21 and thence into the absorber 20. As shown, conduit 21 is arranged with a first downward loop having its descending leg in heat exchange relation with the cool enriched solution in heat exchanger 24 and a second downward loop into the absorber in heat exchange relation at 32 with conduit 19 in which flows the cool rich gas from the evaporator. The hot weak solution flowing in conduit 21 by capillarity is cooled in the descending portions of said loops whereby the density of the liquid in these portions is increased and the flow of weak solution aided by gravity.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. A refrigeration system of the absorption type including a generator, an absorber, a capillary syphon for transferring absorption solution from said generator to said absorber, and a conduit for enriched absorption solution from said absorber to said generator extending in heat exchange relation with a descending portion of said syphon.

2. A refrigeration system of the absorption type including a generator, an absorber, an evaporator, a capillary syphon for transferring liquid from said generator to said absorber, and a conduit for gas from said evaporator to said absorber extending in heat exchange relation with a descending portion of said syphon.

3. A refrigeration system of the absorption type including a generator, an absorber, an evaporator, a capillary syphon for liquid from said generator to said absorber having a plurality of rising and descending portions, a conduit for returning liquid from said absorber to said generator extending in thermal exchange relation with one of said descending portions, and a conduit for gas from said evaporator to said absorber extending in thermal exchange relation with another of said descending portions.

4. A refrigeration system of the absorption type comprising a generator, an absorber interconnected with said generator for the circulation of absorption solution therebetween, an evaporator interconnected with said absorber for the circulation of inert gas therebetween, a condenser connected to receive vapor from said generator and deliver condensate to said evaporator, and a capillary syphon for causing circulation of solution between said generator and absorber, said system being arranged such that a descending portion of said syphon is maintained at a lower temperature than a rising portion thereof.

5. In a refrigeration system of the absorption type comprising a generator, condenser, evaporator, and absorber interconnected for the circulation of a cooling fluid, a capillary syphon for causing circulation of absorption solution between said generator and absorber, and means for cooling the descending portion of said syphon.

6. In an absorption type refrigerating system including an absorption solution circuit having a heated portion and a cooled portion, a capillary syphon for causing circulation of solution through said circuit situated to lift liquid in said circuit.

7. In an absorption type refrigerating system including an absorption solution circuit having a heated portion and a cooled portion, a wick for causing circulation of solution through said circuit situated to lift liquid in said circuit.

8. In a refrigerating system of the absorption type, means forming a circuit for absorption solution, means for causing circulation of solution in said circuit comprising a capillary syphon, and means for maintaining the descending portion of said syphon at a lower temperature than the rising portion thereof.

9. In a refrigerating system of the absorption type, means forming a circuit for absorption solution, means for heating one portion of said circuit, means for cooling another portion of said circuit, and a capillary syphon in said circuit for causing liquid circulation therethrough, said circuit being arranged such that the descending portion of said syphon is maintained at a lower temperature than the rising portion thereof.

10. Absorption refrigerating apparatus including a generator, an absorber, a condenser, an evaporator, means to conduct vaporous refrigerant from the generator to the condenser, means to conduct liquid refrigerant from the condenser to the evaporator, means to circulate an auxiliary gas between the evaporator and the absorber, and means within said apparatus for circulating liquid between the generator and the absorber including a material capable of attracting liquid without receiving external energy.

11. Absorption refrigerating apparatus including a generator, an absorber, a condenser, an evaporator, means to conduct vaporous refrigerant from the generator to the condenser, means to conduct liquid refrigerant from the condenser to the evaporator, means to circulate an auxiliary gas between the evaporator and the absorber, means within said apparatus for circulating liquid between the generator and the absorber including a material capable of attracting liquid without receiving external energy, and means to raise liquid in the absorber above the location of liquid therein due to gravity.

12. Absorption refrigerating apparatus including a generator, an absorber, a condenser, an evaporator, means to conduct vaporous refrigerant from the generator to the condenser, means to conduct liquid refrigerant from the condenser to the evaporator, means to circulate an auxiliary gas between the evaporator and the absorber, capillary means for circulating liquid between the generator and the absorber, and capillary means to raise liquid in the absorber into contact with the auxiliary gas above the location of liquid therein effected by said liquid circulating means.

13. Absorption refrigerating apparatus including a generator, an absorber, a condenser, an evaporator, means to conduct vaporous refrigerant from the generator to the condenser, means to conduct liquid refrigerant from the condenser to the evaporator, means to circulate an auxiliary gas between the evaporator and the absorber, capillary means for circulating liquid between the generator and the absorber, and material in the absorber capable of attracting liquid without receiving external energy to raise liquid in the absorber above the location of liquid therein due to gravity into contact with the auxiliary gas.

14. Absorption refrigerating apparatus including a generator, an absorber, a condenser, an evaporator, means to conduct vaporous refrigerant from the generator to the condenser, means to conduct liquid refrigerant from the condenser to the evaporator, means to circulate an auxiliary gas between the evaporator and the absorber, and liquid suction means within said apparatus for producing circulation between the generator and the absorber and for raising liquid in the absorber into contact with the auxiliary gas.

15. Absorption refrigerating apparatus including a generator, an absorber, a condenser, an evaporator, means to conduct vaporous refrigerant from the generator to the condenser, means to conduct liquid refrigerant from the condenser to the evaporator, means to circulate an auxiliary gas between the evaporator and the absorber, and capillary material within said apparatus for producing circulation between the generator and the absorber and for raising liquid in the absorber.

PETER KÖHLER.